United States Patent
Garrett et al.

(10) Patent No.: US 9,471,809 B2
(45) Date of Patent: *Oct. 18, 2016

(54) METHOD AND SYSTEM FOR PROVIDING SECURE TRANSACTIONS VIA A BROADBAND GATEWAY

(71) Applicant: BROADCOM CORPORATION, Irvine, CA (US)

(72) Inventors: David Garrett, Tustin, CA (US); Jeyhan Karaoguz, Irvine, CA (US); Xuemin Chen, Rancho Santa Fe, CA (US); Wael William Diab, San Francisco, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,012

(22) Filed: Nov. 19, 2014

(65) Prior Publication Data

US 2015/0082415 A1     Mar. 19, 2015

Related U.S. Application Data

(63) Continuation of application No. 12/982,440, filed on Dec. 30, 2010, now Pat. No. 8,898,286.

(60) Provisional application No. 61/351,696, filed on Jun. 4, 2010.

(51) Int. Cl.
   *G06Q 30/02* (2012.01)
   *G06F 21/62* (2013.01)
   (Continued)

(52) U.S. Cl.
   CPC .......... *G06F 21/6245* (2013.01); *G05B 13/02* (2013.01); *G05F 1/66* (2013.01);
   (Continued)

(58) Field of Classification Search
   CPC ....... G06Q 20/10; G06Q 20/29; G06Q 20/40
   See application file for complete search history.

(56) References Cited

U.S. PATENT DOCUMENTS

| 6,243,379 B1 | 6/2001 | Veerina et al. |
| 6,243,689 B1 | 6/2001 | Norton |

(Continued)

FOREIGN PATENT DOCUMENTS

| WO | WO 2009113931 | 9/2009 |

OTHER PUBLICATIONS

Non-Final Office Action for U.S. Appl. No. 12/982,440 mailed Mar. 22, 2013.

(Continued)

*Primary Examiner* — Jeong S Park
(74) *Attorney, Agent, or Firm* — Foley & Lardner LLP; Christopher J. McKenna; Paul M. H. Pua

(57) ABSTRACT

A broadband gateway may be used to authorize transactions associated with one or more accounts, which may be associated with a user of the broadband gateway. The transaction may be handled by the broadband gateway. The authorizations may be performed based on information associated with the accounts, whose storage may be controlled by the broadband gateway. The broadband gateway may block and/or terminate transactions failing authentication and/or validation, which may be performed based on the stored information. The transactions may be initiated within a network serviced by the broadband gateway. The transactions may also be initiated outside the serviced network. The stored information may comprise a user profile, which may comprise a plurality of settings for controlling and/or managing authorization performed by the broadband gateway. The user profiles may be configurable by users, wherein configuration may comprise initializing and/or modifying one or more of the transaction related settings.

20 Claims, 4 Drawing Sheets

(51) Int. Cl.
| | |
|---|---|
| H04L 29/06 | (2006.01) |
| H04W 12/08 | (2009.01) |
| H04N 21/63 | (2011.01) |
| H04L 29/08 | (2006.01) |
| H04L 12/28 | (2006.01) |
| H04L 12/64 | (2006.01) |
| G06Q 20/10 | (2012.01) |
| H04L 12/24 | (2006.01) |
| H04L 12/857 | (2013.01) |
| G06F 21/10 | (2013.01) |
| G06Q 40/00 | (2012.01) |
| G05B 13/02 | (2006.01) |
| G05F 1/66 | (2006.01) |
| G06Q 30/04 | (2012.01) |
| H04L 12/14 | (2006.01) |
| H04L 12/66 | (2006.01) |
| H04N 5/445 | (2011.01) |
| H04N 21/482 | (2011.01) |
| H04N 21/436 | (2011.01) |
| H04N 21/454 | (2011.01) |
| H04N 21/6371 | (2011.01) |
| H04N 21/6373 | (2011.01) |
| H04N 21/472 | (2011.01) |
| H04N 21/258 | (2011.01) |
| H04N 21/6543 | (2011.01) |

(52) U.S. Cl.
CPC ............ *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/2801* (2013.01); *H04L 12/2838* (2013.01); *H04L 12/6402* (2013.01); *H04L 12/66* (2013.01); *H04L 29/06095* (2013.01); *H04L 41/0816* (2013.01); *H04L 41/32* (2013.01); *H04L 47/2491* (2013.01); *H04L 63/02* (2013.01); *H04L 63/0281* (2013.01); *H04L 63/10* (2013.01); *H04L 63/205* (2013.01); *H04L 65/102* (2013.01); *H04L 65/103* (2013.01); *H04L 65/1023* (2013.01); *H04L 65/1033* (2013.01); *H04L 65/1036* (2013.01); *H04L 65/40* (2013.01); *H04L 67/10* (2013.01); *H04L 67/104* (2013.01); *H04L 67/1078* (2013.01); *H04L 67/1095* (2013.01); *H04L 67/12* (2013.01); *H04L 67/16* (2013.01); *H04L 67/2842* (2013.01); *H04N 5/445* (2013.01); *H04N 21/43615* (2013.01); *H04N 21/454* (2013.01); *H04N 21/482* (2013.01); *H04N 21/632* (2013.01); *H04N 21/6371* (2013.01); *H04N 21/6373* (2013.01); *H04W 12/08* (2013.01); *G06F 2221/07* (2013.01); *H04L 41/5019* (2013.01); *H04L 65/4084* (2013.01); *H04L 2012/2849* (2013.01); *H04N 21/258* (2013.01); *H04N 21/47202* (2013.01); *H04N 21/6543* (2013.01); *Y02B 60/43* (2013.01)

(56) References Cited

U.S. PATENT DOCUMENTS

| | | | |
|---|---|---|---|
| 6,931,109 | B1 | 8/2005 | Cook |
| 8,898,286 | B2* | 11/2014 | Garrett .................. G06Q 20/10 709/224 |
| 2001/0016877 | A1 | 8/2001 | Dancs et al. |
| 2005/0233744 | A1* | 10/2005 | Karaoguz ............ H04W 12/08 455/432.3 |
| 2007/0063024 | A1* | 3/2007 | Guillot .................. G06Q 20/20 235/380 |
| 2007/0187491 | A1* | 8/2007 | Godwin ................ G06Q 20/12 235/380 |
| 2009/0287603 | A1 | 11/2009 | Lamar et al. |
| 2010/0188975 | A1* | 7/2010 | Raleigh ........... G06Q 10/06375 370/230.1 |
| 2011/0002341 | A1 | 1/2011 | Damola et al. |

OTHER PUBLICATIONS

Final Office Action for U.S. Appl. No. 12/982,440 mailed Aug. 23, 2013.

Non-Final Office Action for U.S. Appl. No. 12/982,440 mailed Feb. 13, 2014.

Notice of Allowance for U.S. Appl. No. 12/982,440 mailed Jul. 11, 2014.

* cited by examiner

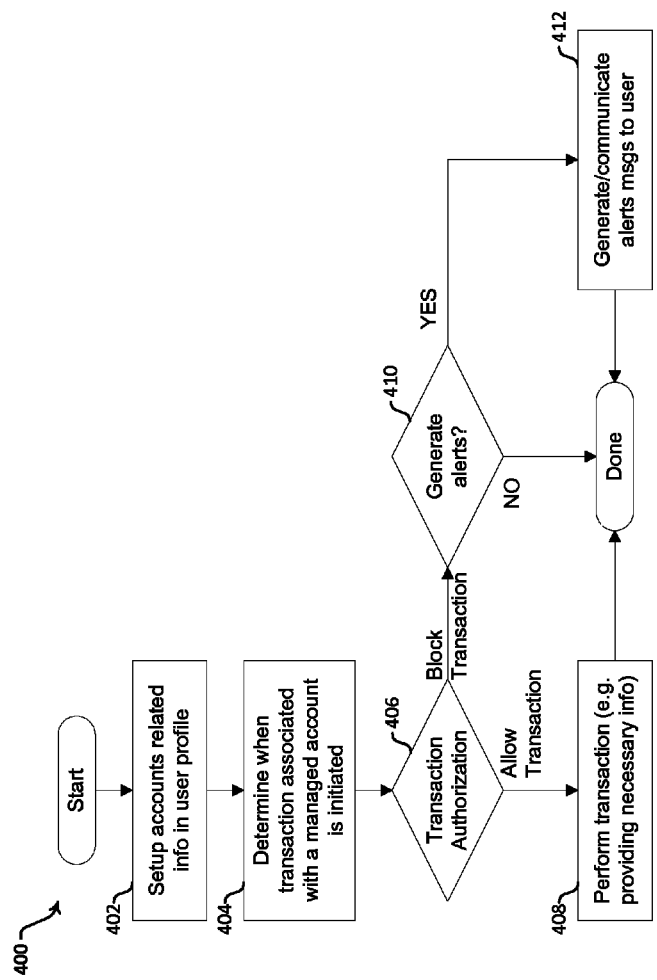

METHOD AND SYSTEM FOR PROVIDING SECURE TRANSACTIONS VIA A BROADBAND GATEWAY

CROSS-REFERENCE TO RELATED APPLICATIONS/INCORPORATION BY REFERENCE

This patent application is a continuation of, and claims priority to and the benefit of U.S. patent application Ser. No. 12/982,440, filed Dec. 30, 2010, which makes reference to, claims priority to and claims benefit from U.S. Provisional Application Ser. No. 61/351,696 filed on Jun. 4, 2010. The entire contents of the foregoing applications are hereby incorporated herein by reference for all purposes. This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/981,414 filed on Dec. 30, 2010; and
U.S. patent application Ser. No. 12/981,733 filed on Dec. 30, 2010.
Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for providing secure transactions via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing secure transactions via a broadband gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow chart that illustrates exemplary steps for providing secure transactions via a broadband gateway, in accordance with an embodiment of the invention.

DETAILED DESCRIPTION OF THE INVENTION

Certain embodiments of the invention may be found in a method and system for providing secure transactions via a broadband gateway. In various embodiments of the invention, a broadband gateway that is operable to handle multiple physical layer connections to a corresponding plurality of network access service providers, may provide a secure transaction service. The secure transaction service may comprise authorizing transactions associated with one or more accounts, which may be associated with a user of the broadband gateway. The authorization may be performed based on information associated with the accounts. The broadband gateway may control storage of the information associated with the accounts. The transactions may be handled by the broadband gateway. The broadband gateway may block and/or terminate transactions failing authentication and/or validation. In this regard, the broadband gateway may perform the authentication and/or validation based on the stored information associated with the accounts. The transactions may be initiated within a home network serviced by the broadband gateway, by an associated user, using one or more of the devices serviced by the broadband gateway within the home network for example. The transactions may also be initiated outside the home network.

The stored information may comprise a user profile, which may comprise a plurality of settings for controlling and/or managing authorization performed by the broadband gateway. The user profiles may be configured by an owner and/or user of the broadband gateway. In this regard, the user profile configuration may comprise initializing and/or modifying one or more of the settings utilized for controlling and/or managing transaction authorization via the broadband gateway. The broadband gateway may generate, maintain, and/or update activity summary associated with one or more of the accounts. The activity data may be generated and/or modified based on monitoring of activity of one or more of the accounts. The activity data may be provided to users, by displaying it utilizing, for example, a graphical user interface. The user interface may also be utilized for configuring the user profiles. Furthermore, the broadband gateway may generate alerts based on activity monitoring, and/or based on criteria established for the pertinent account(s), which may specified by the users for example. The generated alerts may be communicated to the user(s) using one or more communication devices that may be operable to communicate with the broadband gateway, within the home network or outside it.

Figure 1:
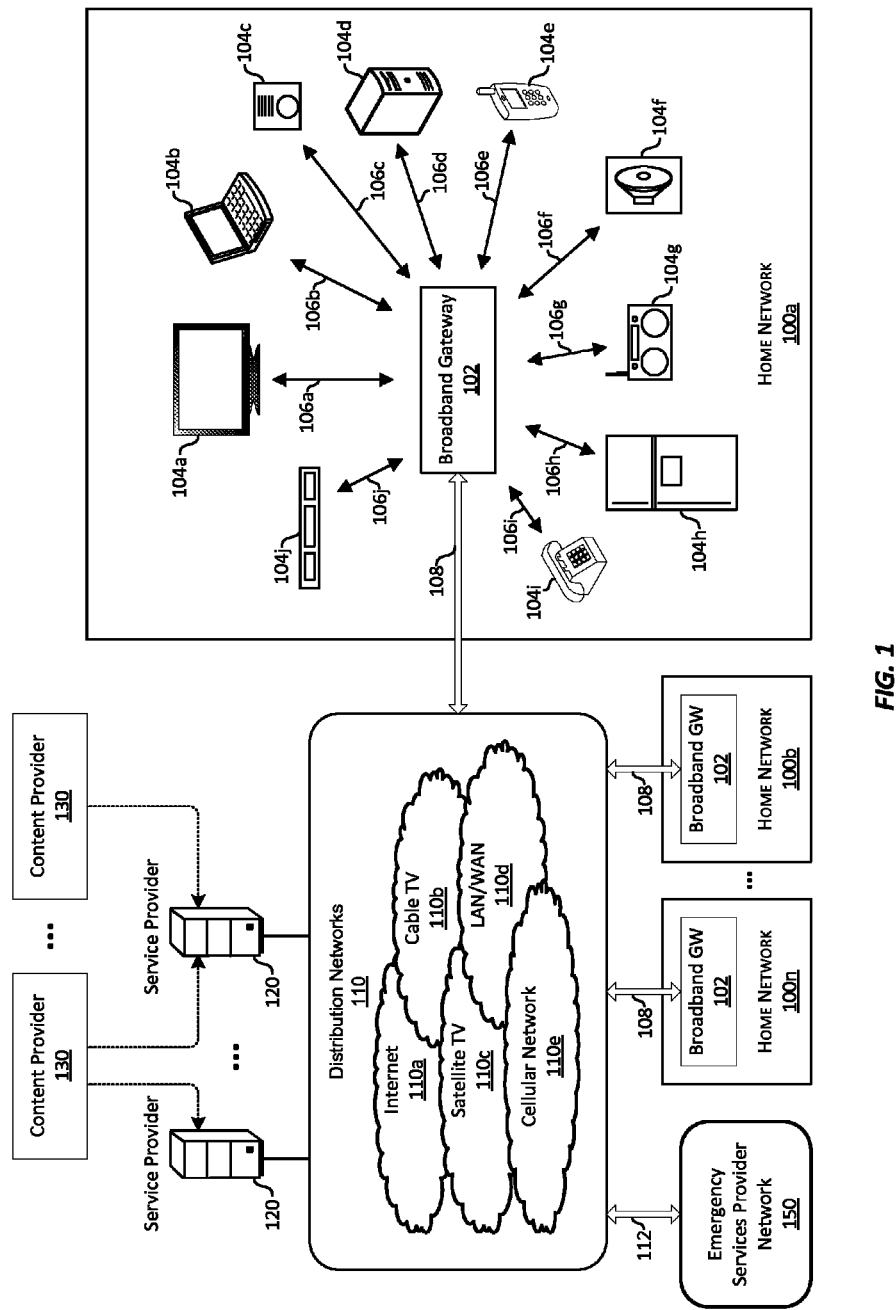
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. In this regard, the home network 100a may comprise a plurality of home devices 104a-104j. Also shown in FIG. 1 are additional home networks 100b, . . . , 100n, and an emergency services provider network 150. Each of the home networks 100b, . . . , 100n may also be serviced by a broadband gateway 102.

The service providers 120 may comprise various entities which may provide, using different access technologies, various services to broadband gateways 102 and/or to devices serviced by the broadband gateways 102, such as the plurality of home devices 104a-104j. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the broadband gateway 102. Such physical layer connections may then be utilized to access content provided by the content providers 130, access services provided by other ones of the service providers 120, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120 to facilitate receiving content originating from one or more of the content providers 130.

The content providers 130 may comprise various entities and/or networks which may generate, capture, and/or package content that may be distributed to end-users, via the service providers 120 and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). The content may be, for example, downloadable and/or streaming, rented and/or purchased. Content originating from the content providers 130 may be distributed to the end-users (e.g. consumers) by the service providers 120. Content providers 130 and service providers 120 may be separate entities. In some instances, however, a single provider may provide both content and services. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may enable wireless and/or wired communication among a plurality of local and/or remote entities, based on one or more networking and/or communication infrastructures. In this regard, the plurality of distribution network 110 may be utilized to enable distribution of multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, Internet 110a, the Cable Television (CATV) network 110b, Satellite Television (TV) network 110c, wireless local network area/wide network area (LAN/WAN) 110d, and/or cellular network 110e.

The Internet 110a may comprise a system of interconnected networks to enable exchange of data between a plurality of nodes, based on one or more networking standards, including, for example, the Internet protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the TCP/IP protocol for example.

The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces and/or code that may be operable to enable implementation of one or more wired and/or wireless local network area (LAN) or wide area network (WAN) standards and/or protocols. Exemplary WAN technologies comprise, for example, WiMAX based networks. Exemplary LAN technologies may comprise, for example, 802.11 based standards, including, for example, WiFi based networks. The cellular network 110e may comprise suitable logic, circuitry, interfaces and/or code that may be operable to enable communication via one or more cellular technologies. Exemplary cellular technologies may comprise CDMA, WCDMA, CDMA1000, HSDPA, GSM, GPRS, EDGE, and/or UMTS. The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices which may be serviced and/or managed by the broadband gateway 102. In this regard, the location may be a residence (e.g. home or apartment), a small business, a school, a library, and/or other like settings in which users may want to obtain access to service and/or content provider networks. The broadband gateway 102 may be utilized in the home network 102 to provide connectivity between the home network 100a and the services providers 120 (and/or the content providers 130) via the distribution networks 110.

The broadband gateway 102 may comprise suitable logic, circuitry, interfaces, and/or code that may be operable to implement various aspects of the invention. The broadband gateway 102 may be operable to communicate with the content providers 130, the service providers 120, and the plurality of home devices 104a-104j. In this manner, the broadband gateway 102 may enable bidirectional communication of content and/or other information between the content providers 130, the service providers 120 and the devices 104a-104j. Communications between the broadband gateway 102 and the content providers 130 and/or service providers 120 may be carried over optical, wired, and/or wireless links of the distribution network(s) 110. Similarly, Communications between the broadband gateway 102 and the devices 104a-104j may be carried over optical, wired, and/or wireless links. In an exemplary aspect of the invention, a single broadband gateway 102 may be operable to handle multiple physical layer (i.e., layer 1 of the open-systems interconnection model (OSI)) connections to multiple ones, or portions, of the distribution network(s) 110, where different ones or portions of the distribution network(s) 110 are owned, operated, leased, or otherwise associated with different ones of the network access service providers 120. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

For example, the broadband gateway 102 may be operable to configure and/or utilize one or more of a plurality of broadband connections 108 to the distribution networks 110. The broadband connections 108 may comprise wired and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may enable communication of multimedia content from one or more content providers 130. The multimedia content may be delivered through one or more services providers 120. For example, the broadband gateway 102 may be operable to perform such operations as network access processing comprising PHY/MAC, and/or transport layer processing, as well as encryption and/or decryption, user and/or device authentication, and/or video and/or audio processing, to facilitate communication and/or consumption of multimedia content. The broadband gateway 102 may communicate with various devices in the home network 100a, using optical, wired and/or wireless communication links. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, broadband gateway 102 may communicate with the various devices in the home via more than one home network.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, an appliance 104h (e.g., refrigerator), a phone 104i, and a digital video recorder (DVR) or personal video recorder (PVR) 104j. The broadband gateway 102 may interact with each of the home devices 104a-104j via corresponding links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a wired or wireless link. The link 106i may comprise, for example, a phone line. The link 106j may comprise, for example, a wired or a wireless link. Although in the embodiment illustrated in FIG. 1 the home devices 104a-104j are shown as being communicatively coupled to only the broadband gateway 102, the invention may not be so limited. Accordingly, the devices 104a-104j may be communicatively coupled to multiple broadband gateways in a local or home network, and/or may be communicate directly, without departing from the spirit and scope of various embodiments of the invention.

The broadband gateway 102 may also be operable to provide and/or support various other, non-content related services in the home network 100a. For example, the broadband gateway 102 may be operable to provide energy management in the home network 102, by controlling and/or adjusting configuration of one or more devices in the home network to reduce power consumption for example. The broadband gateway 102 may also provide emergency-related services in the home network 100a. For example, the emergency services provider network 150 may be connected to the distribution networks 110 via a link 112. The emergency services provider network 150 may be associated with one or more emergency service provider entities. For example, a public entity such as a 911 center and/or a private entity such as a security company may be able to interact with the broadband gateway 102 in the home network 100a via the distribution networks 110. In various embodiments of the invention, the broadband gateway 102 may be operable to provide secure transactions to users serviced by the broadband gateway 102 in the home network 100a.

While the broadband gateway 102 is shown in FIG. 1 as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

In operation, the broadband gateway 102 may be utilized as an interface device that may allow one or more service providers 120 and/or content providers 130 to interact with various devices in a home network, such as in the home network 100a. In this regard, the broadband gateway 102 may be operable to perform and/or provide various services that may enable communication of multimedia content from one or more content providers, wherein the content may be delivered through one or more services providers. The broadband gateway 102 may distribute the received multimedia content to one or more devices in a home network, for consumption, and/or may perform, directly and/or indirectly using other devices, any processing and/or operations such as decryption, device authentication and/or user account validation, which may ensure that the content may be consumed by the target home device(s). The broadband gateway 102 may be operable to adapt and/or enable changes in a subscription model and/or in multimedia delivery characteristics based on the capabilities of the various devices in the home network. In this regard, the broadband gateway 102 may be utilized to reduce bandwidth and/or processing power consumption in the home network 100a.

The broadband gateway 102 may also support and/or use multi-transport processing, which may be performed sequentially, in parallel, and/or utilizing distributed processing. The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QoS), and network protocols supported by the devices in the home network, such as service level agreements (SLAs), for example.

The broadband gateway 102 may also provide and/or support various other, non-content related services in the home network 100a. For example, the broadband gateway 102 may be operable to provide energy management in the home network 102, by controlling and/or adjusting configuration of one or more devices in the home network to reduce power consumption for example. The broadband gateway 102 may also provide emergency-related services in the home network 100a, including allowing first responders to provide alerts to a select group of users by accessing the broadband gateway 102 via secure links provided by the service/content providers.

In an exemplary aspect of the invention, the broadband gateway 102 may provide a secure transaction service. In this regard, the broadband gateway 102 may be utilized to authorize financial transactions presumptively initiated by users associated with the broadband gateway 102. in this regard, authorization may comprise validating and/or authenticating the transactions, to ensure that the transaction was initiated by a particular user, a specific device and/or providing information necessary for completing the transaction. The transactions may be related to obtaining content via the broadband gateways 102, and/or services and/or applications performed and/or provided by the broadband gateway 102 in the home network 100a. For example, the users may try to purchase video and/or audio content which may be downloaded via the broadband gateway 102 from corresponding content provider 120 through the Internet 110a. Alternatively, the transactions may be unrelated to operations of, and/or services or applications provided by the broadband gateway 102. In this regard, the broadband gateway 102 may be utilized to secure any transitions involving users associated with the broadband gateway 102. For example, the broadband gateway 102 may provide secure transactions services for a plurality of accounts associated with a particular user, regardless of the items being paid for using the these accounts during the transactions. In this regard, the accounts may be managed and/or controlled by the secure transaction services provided by the broadband gateway 102. The accounts may correspond to, for example, credit cards, debit cards, and/or bank accounts owned and/or used by the user, to pay for transactions for example.

Transactions that may be subject to authorization by the broadband gateway 102, using the secure transaction service, may be initiated within the home network 100a, and/or outside it. For example, a user may initiate a transaction using the computer 104d within the home network 100a, in which an amount may be charged to a credit card associated with the user. Alternatively, a user associated with the broadband gateway 102 may attempt to initiate transactions at locations outside the home network 100a (e.g. stores or coffee shops). For financial transactions initiated within the home network 100a, and because the broadband gateway 100 is used for external connectivity, the requests may naturally be routed through the broadband gateway 102. Accordingly, once a transaction request is detected by the broadband gateway 102 (e.g. based on tag and/or information therein), the broadband gateway 102 may authenticate and/or validate the transaction request before authorizing the transaction to proceed. For financial transactions initiated outside the home network 100a, transaction (charge) requests may be forwarded first to the broadband gateway 102, through the Internet 110a for example, from the location where the user is attempting to initiate the transaction. The broadband gateway 102 may then authenticate and/or validate the transaction requests before allowing the transaction to go through, by resending it through the Internet 110a to the interested party for example. In one exemplary embodiment of the invention, the information required for completing transactions, such as credit card number, electronic signature, and/or expiration date, may be maintained by, and/or communicated by the broadband gateway 102. Accordingly, temporary information may be utilized when initiating the transactions, which may then be replaced with the actual information in the broadband gateway 102 as part of the authorization procedure performed thereby.

The secure transaction service provided by the broadband gateway 102 may also enable securing and/or authorizing direct transactions between users associated with the broadband gateway 102, and interested parties within or outside the home network 100a. In this regard, interested parties may be required to authorize transactions with broadband gateway 102, after receiving requests to initiate the transaction from the user, before proceeding with the transaction. Alternatively, the user may provide, in conjunction with requests for transactions that are sent to interested parties, partial information to authenticate the transaction. The interested parties may then communicate with the broadband gateway 102, to obtain remaining information to enable completing the authentication and/or transaction. In this regard, securing transactions may be further enhanced by ensuring that neither the user nor the broadband gateway 102 would have all the information required to authorize and complete transactions. In an embodiment of the invention, the secure transaction service may be further enhanced by providing it in conjunction with implementing the broadband gateway 102 in virtual and/or distributed manner. For example, in instances where the broadband gateway 102 is implemented, wholly or partially, as one or more virtual machines, users associated with the broadband gateway 102 may be able to moves the authentication procedures, or parts thereof, into the external network cloud (e.g. within the distribution networks 110), to guard against and/or prevent a complete shutdown or denial of transactions even in instances in where local connectivity may be lost and/or where some physical components of the broadband gateway 102 go offline or power off.

The secure transaction service provided by the broadband gateway 102 may also allow aggregation of multiple, similar transactions such that a single charge may be assessed against an associated and/or managed account. For example, the broadband gateway 102 may be operable to aggregate all transactions for purchase of a particular type of content such as music files from a particular provider. The aggregation may be done such that a particular account associated with a user (e.g. credit card) may only be charged once rather than having to be charged for every purchase since the amount involve may relatively be small in each purchase. In this regard, one or more control parameters may be specified to control such aggregation by the broadband gateway 102.

Exemplary control parameters may comprise number of purchase and/or a total (charge) threshold at which the single transaction may be triggered.

In various embodiments of the invention, the secure transaction service, and/or various aspects thereof, may be configurable. Exemplary configuration criteria may comprise specifying authorization policies, such as no-authorization, authorization, and/or blocking of transactions, based on geographical and/or location limits, amount limits, time limits, transaction types, and/or device related information. For example, amount limits may be specified for requiring (or not) transactions authorization and/or for blocking transactions. In this regard, transactions with amounts below a minimum per-transaction limit, for example, may go through without any authorization by the broadband gateway 102. On the other hand, transactions exceeding a maximum per-transaction limit, and/or which may cause a specified account total-transactions limit to be exceeded, may be blocked for example. The geographical and/or location limits may comprise information defining locations where transactions may be allowed to go through without any authorization and/or where transaction may be completely blocked. For example, transactions within the home network 100a, and/or at locations that may be specifically flagged as trusted locations (e.g. certain stores in proximity of the home network 100a), may be allowed to proceed without authorization. On the other hand, transactions initiated from certain locations such as certain countries and/or States, may be completely blocks.

Transactions may also be blocked when initiated at certain times (e.g. between midnight and 7:00 AM, when the user is unlikely to be initiating the transactions). Transactions may also be allowed without authorization, and/or blocked, based on the type of items involved in the transactions. For example, purchase of certain types of content and/or merchandise may be blocked. Also, different authorization policies may be specified for different devices from which transaction may be initiated. For example, a transaction may be allowed to proceed without any authorization if initiated using the computer 104b, whereas the same transaction may require authorization if initiated using the mobile device 104e. The location of initiation of the transaction and/or the identity of the device utilized to initiate the transaction may also be utilized as criteria for authorizing particular transaction.

The secure transaction service may enable monitoring activity associated with one or more accounts managed by the secure transaction service, and generating one or more alerts based on the activity and on criteria established for one or more of the plurality of accounts may incorporate communication function that may enable communicating transaction and/or account related information to users associated with managed accounts. For example, the broadband gateway 102 may be operable to communicate one or more alert messages when unauthorized transactions are detected. The alert message may be communicated to devices used by the users, such as the mobile device 104e, when in use by the users in the home network 100a and/or outside it. The broadband gateway 102 may be operable to generate and communicate activity summary data, which may be displayed, using the television 104a and/or the computer 104b for example. In this regard, the activity summary data may comprise information detailing all transactions requested and/or completed via the broadband gateway 102, and details related thereto. In this regard, the details may correspond to authorization of transactions, chronological and/or geographical data corresponding to when and/or where transactions were initiated, and/or devices from where the transactions were initiated and/or devices utilized in conjunction with the transactions.

Figure 2:
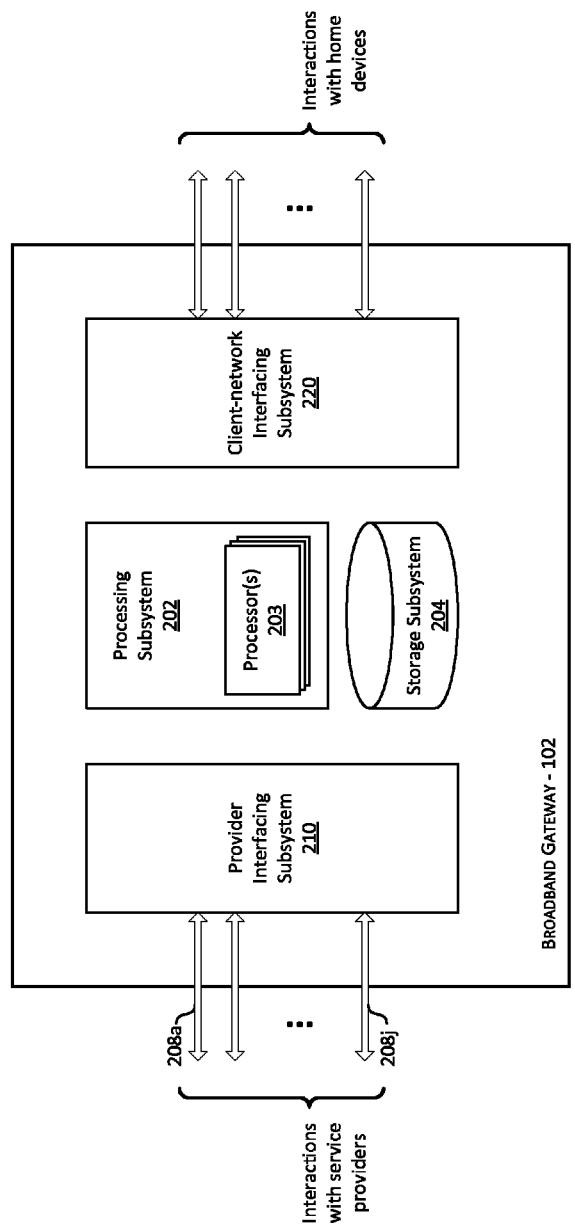
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown the broadband gateway 102 of FIG. 1.

The broadband gateway 102 may comprise multiple hardware and/or software modules and/or subsystems, such as, for example, a processing subsystem 202, a storage subsystem 204, a provider interfacing subsystem 210, and a client network interfacing subsystem 220. In some instances, the broadband gateway 102 may be such that the various modules listed above may be distributed over multiple devices. Moreover, the modules listed above are provided by way of illustration and not of limitation. Other configurations and/or architectures of the broadband gateway 102 may be implemented. For example, the broadband gateway 102 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100a. In this regard, the processing subsystem 202 may comprise one or more portions that are suitable to handle certain types of data such as video data and/or audio data, for example. The processing subsystem 202 may also be operable to control and/or manage operations of the broadband gateway 102, and/or performing tasks and/or applications therein. For example, the processing subsystem 202 may enable execution of applications, programs and/or code which may be stored in the storage subsystem 204, for example. In this regard, the processing subsystem 202 may be operable to configure and/or control operations of various components and/or subsystems of the broadband gateway 102, and/or other devices managed by and/or connected to broadband gateway, by utilizing, for example, one or more control signals.

The processing subsystem 202 may also control data transfers within the broadband gateway 102, in the course of performing various applications and/or tasks for example. The processing subsystem 202 may comprise, for example, a plurality of processors 203, which may be general and/or specialized processors (e.g. CPU, video processors, and/or audio processors). While the processing subsystem 202 is shown herein as a single block, the invention needs not be so limited. Accordingly, in instances where the broadband gateway is implemented a distributed platform, some of the operations and/or functions described herein with regard to the processing subsystems may be performed by different components that may be located in different devices.

The storage subsystem 204 may comprise suitable logic, circuitry, interfaces, and/or code that may be operable to store data utilized in the operations of the broadband gateway 102. In this regard, the storage subsystem 204 may comprise one or more memory devices that may enable permanent and/or non-permanent storage, buffering, and/or fetching of data, code and/or other information which may be used, consumed, and/or handled in the broadband gateway 102. For example, the storage subsystem 204 may be utilized to store configuration data, parameters, device information, tracking and/or monitoring information, security information, and intermediate processing data, for example. The storage subsystem 204 may comprise storage media integrated in the broadband gateway 102 and/or one or more removable storage devices. In this regard, the storage subsystem 204 may comprise different memory technologies, including, for example, read-only memory (ROM), random access memory (RAM), Flash memory, solid-state drives (SSDs), and/or field-programmable gate arrays (FPGAs).

The provider interfacing subsystem 210 may comprise suitable logic, circuitry, interfaces, and/or code that may be operable to communicate data, via one or more physical layer connections 208a-208j, to one or more corresponding network access service providers, via the distribution networks 110 for example. The provider interfacing subsystem 210 may be operable to support multiple communication protocols, standards, and/or data transport technologies. In this regard, each of the physical layer connections 208a-208j may connect the gateway 102 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120 and/or content providers 130, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 102 and communication devices located outside the home network 100a, directly and/or indirectly through distribution networks corresponding to one or more service providers. The provider interfacing subsystem 210 may enable concurrently communicating with multiple and/or different service/content providers and/or devices.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j, substantially as describe with regard to FIG. 1.

In operation, the broadband gateway 102 may be utilized as an interface device that provides connectivity between service and/or content providers and devices in a home network, such as the home network 100a. In this regard, the broadband gateway 102 may enable and/or facilitate communication of content, such as multimedia content, from one or more content providers. The content may be delivered through one or more services providers. For example, the broadband gateway may communicate with one or more service providers 120 via the provider interfacing subsystem 210, to facilitate transmitting requests to, and/or receiving content from the service providers 130, via one or more of the distribution networks 110. The broadband gateway 102 may also be operable to communicate with a plurality of home devices in a home network, such as the devices 104a-104j in the home network 100a, using the client-network interfacing subsystem 220. In this regard, the client-network interfacing subsystem 220 may support use of one or more of the links 106a-106j. In this regard, the client-network interfacing subsystem 220 may support use of one or more of the links 106a-106j. The broadband gateway 102 may also be operable to provide various services and/or tasks in the home network 100a. Accordingly, the broadband gateway 102 may be operable to distribute the received content to one or more home devices, for content consumption, and/or may perform, directly via the processing subsystem 202 and/or indirectly using other devices, any processing and/or functions comprising, for example decryption and/or account validation, which that may be necessary to ensure that the content may be consumed by one or more of the target home devices.

The broadband gateway 102 may also be operable to communicate with a plurality of home devices in a home network, such as the devices 104a-104j in the home network 100a, using the client-network interfacing subsystem 220. The processing subsystem 202 and/or the storage subsystem 204 may be utilized to create, maintain, and/or update a plurality of profiles corresponding to users, devices, and/or services available in the home network 100a. For example, device profiles may be utilized to store information associated with particular devices that may be coupled to and/or serviced by the broadband gateway 102. In this regard, device profiles may be utilized to store information pertaining to capabilities, limitations, requirement, and/or configuration parameters for the devices. User-profiles may be utilized to store information associated with particular users, such as setting preferences for various devices and/or services that may be utilized by a particular user in conjunction with the broadband gateway 102.

In an exemplary aspect of the invention, the broadband gateway 102 may be operable to generate, using the processing subsystem 202 for example, user interfaces, and/or data corresponding thereto, which may be utilized to enable interactions between the broadband gateway 102 and users in the home network 100a. Exemplary user interfaces may comprise graphic user interfaces (GUIs), which may enable visual and/or aural displaying and/or providing interaction with users. Data inputted and/or outputted using the user interfaces may be stored via the storage subsystem 204. The user interfaces may enable configuring of the broadband gateway 102, and/or any applications and/or services provided thereby. User interfaces may also be utilized to configure and/or adjust other devices in the hone network 100. GUIs, and like interfaces, may be displayed using one or more devices coupled to the broadband gateway 102. For example, user interfaces generated by the broadband gateway 102 may be displayed using the television 104a. User interfaces may be utilized to enable displaying and/or modifying user-profiles for example.

The broadband gateway 102 may provide a secure transaction service, substantially as described with regard to, for example, FIG. 1. In this regard, the processing subsystem 202 may be utilized various operations in conjunction with transactions authorization. For example, the processing subsystem 202 may be operable to perform user and/or account authentication, transaction validations based on any preconfigured limitations, and/or mapping between temporary information and actual information corresponding to accounts. The storage subsystem 204 may be utilized to store and/or maintain data and/or control parameters that may be utilized during transaction authorization operations.

Furthermore, user profiles generated and/or maintained by the broadband gateway 102, in the storage subsystem 204 for example, may be modified and/or configured, using the processing subsystem 202 for example, to add an account management component, which may be utilized in conjunction with the secure transaction service. In this regard, the account management component may be utilized to create entries corresponding to a plurality of accounts associated with a particular user. The account entries may be utilized to store various parameters associated with each account, which may be utilized for transactions associated with these accounts. For example, for accounts associated with credit cards, credit card number and/or expiration date may be defined and/or stored. Furthermore, the account entries may also be utilized to specify and/or configure various polices and/or parameters that may be utilized to control certain aspects of associated transactions, such as transaction authorization for example.

For example, the account entries may enable setting up and/or modifying geographic/location limitations, timing limitations, amount limitations, device limitations, and/or transaction type limitations, substantially as described with regard to FIG. 1. Information corresponding to the account entries may be stored in the storage subsystem 204. Furthermore, the processing subsystem 202 may be utilized to enable adding and/or modifying the account entries, and/or any information corresponding thereto. The account management component, and/or any elements thereof such as the account entries, may also be incorporated into any user interface that may be supported by the broadband gateway 102. For example, GUIs generated and/or supported by the broadband gateway 102, which may BE displayed using devices in the home network 100a to display information and/or receive user input and/or feedback, may be configured to incorporate the account management component. In this regard, the GUIs may be utilized to enable visual and/or aural interactions with users, to display activities pertaining to configured accounts, and/or to enable the users to visually setup, modify, and/or configure account that may be managed by the broadband gateway 102.

Figure 3:
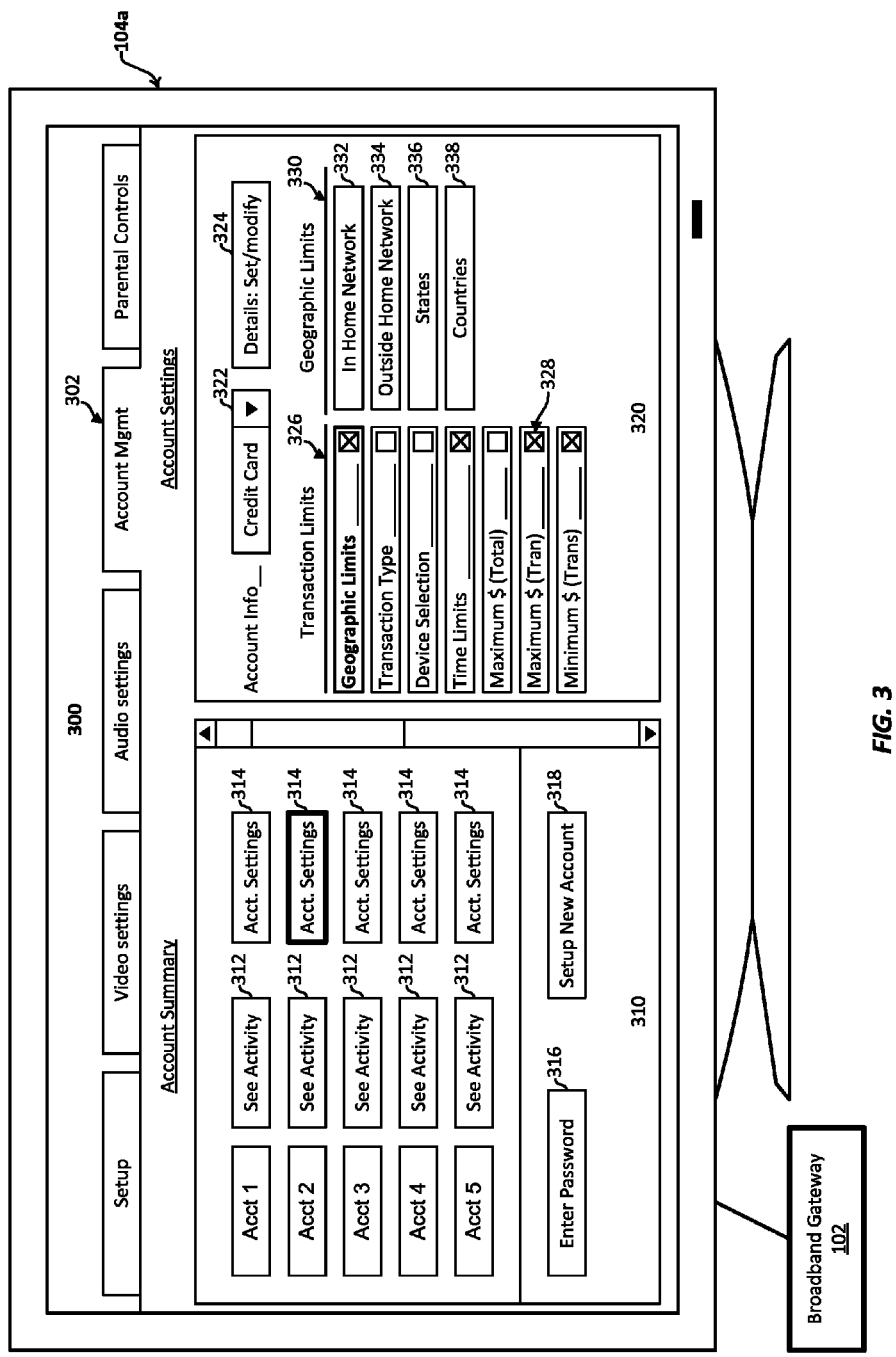
FIG. 3 is a block diagram illustrating an exemplary user interface generated by a broadband gateway for creating and/or managing user accounts, in accordance with an embodiment of the invention.

FIG. 3 is a block diagram illustrating an exemplary user interface generated by a broadband gateway for creating and/or managing user accounts, in accordance with an embodiment of the invention. Referring to FIG. 3, there is shown a user interface 300.

The user interface 300 may, for example, be displayed as part of an on-screen display and may be accessible via a "menu" button. The user interface 300 may be generated by the broadband gateway 102, and/or based on data provided by the broadband gateway 102, to enable interactions between the broadband gateway 102 and users associated with the broadband gateway 102, in the home network 100a for example. The user interface 300 may be displayed using a display device connected to the broadband gateway 102, such as the television 104a for example. In this regard, the link 106a may be utilized to communicate data and/or messages between the broadband gateway 102 and the television 104a, to enable communicating data that may be displayed using the user interface 300, and/or receiving user input, selection, and/or feedback which may be provided based on interactions with the user interface 300.

The exemplary user interface 300 may be utilized to enable users to setup the broadband gateway 102, and/or to control, configure and/or modify various applications and/or tasks, or aspects thereof, which may provided by the broadband gateway 102. In an exemplary aspect of the invention, the user interface 300 may incorporate an account-management function 302, which maybe utilized to setup, configure, and/or track a plurality of accounts associated with a user.

The account-management function 302 may comprise, for example, frames 310 and 320. The frame 310 may display a listing of the all accounts associated with a specific user. Associated with each account may be two buttons 312 and 312. Upon selection or activation of the button 312 by a user, activity and/or information for the corresponding account may be displayed in the frame 320. This may comprise all recent transactions associated with the selected account, within a specific duration that maybe preconfigured and/or dynamically specified. Selection or activation of button 314 may enable configuring various settings for a particular account. These settings may comprise parameters that may control management and/or authentication of any transactions associated with the account, and/or may also comprise parameters that may pertain to displaying of activity and/or generation of alert messages.

The frame 310 may also comprise a button 316, which when activated or selected, may enable entering one or more passwords before proceeding with any selection of buttons 312 or 314. In this regard, a user password may be required before displaying any of the details for the frame 310, for example a listing of accounts. Furthermore, account-specific passwords may also be required on per-account basis, for accessing particular accounts for example. Accordingly, failure to provide the correct corresponding password(s), whether a global password or account-specific password, may prevent displaying frame 320. The frame 310 may also comprise a button 318 which may be selected to enable setting up a new account. Account setup may be performed as a step-by-step procedure based on interactions using frame 320. For example, passwords that which may be necessary when selecting button 316 may be configured as part of the new account setup procedure.

In the exemplary scenario depicted in FIG. 3, account settings for a particular account, such as account #2 for example, is shown in frame 320 based on selection of the appropriate button 314 in frame 310. Accordingly, account settings for the specified account may be displayed and/or configured using the frame 320. In this regard, the frame 320 may comprise an account information section, which may be utilized to specify details regarding the account itself. For example, field 322 may comprise a pull down menu that may be utilized to specify the type of payment system, such as a credit card, which may be associated with transactions for the account. Also associated with the account information is a button 324, which when selected or activated may enable displaying a secondary frame (not shown), as a pop-up frame for example, which may enable the user to enter additional information that may necessary regarding account related payment options. For example, in instances where 'credit card' is chosen as the payment type, selecting button 324 may enable setting up and/or modifying associated credit card information, such as credit card number, expiration date, billing address, and/or any additional necessary that may be necessary to complete any transaction using that credit card.

The frame 320 may also comprise transaction limits field 326 which may list a plurality of fields corresponding to various parameters that may be chosen and/or configured for limiting and/or controlling transactions associated with the selected account. For example, the transactions limits field 326 may list options such as geographical limits, transactions types, device selection, time limits, maximum amount limits (total and/or per-transaction), and/or minimum amount limit per-transaction, which may be utilized to control secure transaction services provided by the broadband gateway. The user may be able to activate/deactivate particular types of transaction limitations by checking/unchecking the selection buttons 328 within the corresponding fields. Users may also be able to specify various aspects and/or information for each of the transactions limitation parameters based on selection or activation of (e.g. by clicking on) the appropriate field(s). For example, based on selecting the geographic limits fields, a corresponding expanded geographic limits field 330 may be display a listing various parameters and/or criteria that may be specified for defining geographical and/or location based limitations on transactions managed and/or authorized by the broadband gateway 102.

The geographic limits field 330 may list, for example, 'In-home-network' button 332, 'Outside-home-network' button 334, 'States' button 336, and 'Countries' button 338. In this regard, selecting the 'In-home-network' button 332 may enable displaying a secondary frame (not shown), as a pop-up frame for example, which may enable the user to specify various authorization policies for transactions initiated within the home network (e.g. allowing all transactions or requiring authorizations). Similarly, selecting the 'Outside-home-network' button 334 may enable displaying a secondary frame (not shown), as a pop-up frame for example, which may enable the user to specify various authorization policies for transactions initiated outside the home network (e.g. allowing all transactions with certain distance from the home network). Selecting the 'States' button 336 may enable displaying a secondary frame (not shown), as a pop-up frame for example, which may enable the user to specify various authorization policies for different States (e.g. blocking all transactions initiated in one or more States). Similarly, selecting the 'Countries' button 336 may enable displaying a secondary frame (not shown), as a pop-up frame for example, which may enable the user to specify various authorization policies for different countries (e.g. blocking all transactions initiated in one or more countries).

FIG. 4 is a flow chart that illustrates exemplary steps for providing secure transactions via a broadband gateway, in accordance with an embodiment of the invention. Referring to FIG. 4, there is shown a flow chart 400 comprising a plurality of exemplary steps that may be performed to enable performing providing secure transactions via a broadband gateway.

In step 402, accounts related information in user profile may be setup and/or modified. For example, the user interface 300 may be utilized to setup accounts, and/or to configure various related information including, for example, transaction related limitations and/or control parameters. In step 404, it may be determined when a transaction associated with a managed account is initiated. For example, the broadband gateway 102 may receive transaction requests which may be initiated by users associated with the broadband gateway 102, which may be within the home network 100*a* and/or outside it. In step 406, transaction authorization may be performed. In this regard, the broadband gateway 102 may authenticate and/or validate the transaction based on, for example, information configured into associated user profile, and/or account entries therein. In instances where the initiated transaction is successfully authenticated and/or verified, the plurality of exemplary steps may proceed to step 408. In step 408, the initiated transaction may be continued and/or completed. In this regard, the broadband gateway 102 may map temporary information to actual information that may be utilized for completing the transactions such as credit card number, authentication code or other unique identification information.

Returning to step 406, where the initiated transaction fails authentication, the plurality of exemplary steps may proceed to step 410. In step 410, a determination whether to generate alert messages based on the failed authentication may be done. In instances where alert messages are required, the plurality of exemplary steps may proceed to step 412. In step 412, alert message(s) may be generated and communicate to the user.

Various embodiments of the invention may comprise a method and system for providing secure transactions via a broadband gateway. The broadband gateway 102, which may be coupled to the plurality of serviced devices 104*a*-104*j* in the home network 100*a* and to one or more external networks, such as the distribution networks 110, may be used to provide a secure transaction service. In this regard, the broadband gateway 102 may be operable to authorize financial transactions associated with one or more accounts, which may be associated with user(s) of the broadband gateway 102. The authorization may be performed, using the processing subsystem 202, based on information associated with the accounts, wherein that information may be maintained by the broadband gateway 102, using the storage subsystem 204. The broadband gateway 102 may block and/or terminate transactions in instances where these transactions fail authentication and/or validation. In this regard, the broadband gateway 102 may perform the authentication and/or validation, using the processing subsystem 202, based on the stored information associated with the corresponding accounts. The transactions may be initiated within the home network 100*a*, by the associated user, using one or more of the serviced devices 104*a*-104*j* within the home network 100*a*. The transactions may also be initiated outside the home network 100*a*.

The stored information may comprise a user profile, which may comprise a plurality of settings for controlling and/or managing authorization performed by the broadband gateway 102. The user profiles may be configurable, by associated user(s) for example. In this regard, the user profile configuration may comprise initializing and/or modifying one or more of the settings utilized for controlling and/or managing transaction authorization via the broadband gateway 102. The broadband gateway 102 may generate, maintain, and/or update activity summary associated with one or more of the accounts. The activity data may be generated and/or modified based on monitoring of activity of one or more of the accounts. The activity data may be provided to users, by displaying it using the user interface 300 for example. The user interface 300 may also be utilized to configure the user profile, and/or elements thereof, which may be utilized for controlling and/or managing the transaction authorization operations. Furthermore, the broadband gateway 102 may generate alerts based on activity monitoring, and/or based on criteria established for the pertinent account(s), which may specified by the users, for example. The generated alerts may be communicated to the user(s) using one or more communication devices that may be operable to communicate with the broadband gateway 102, within the home network 100*a* or outside it.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing secure transactions via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
controlling, by a broadband gateway in communication with a plurality of devices, storage of information associated with a user account;
aggregating, by the broadband gateway, a plurality of transactions into a single transaction, the plurality of transactions associated with the user account and initiated by two or more of the plurality of devices to be conducted through the broadband gateway, each of the plurality of transactions comprising a financial transaction initiated via a respective device of the plurality of devices, the broadband gateway providing the plurality of devices access to one or more network access service providers;
authorizing, by the broadband gateway, the single transaction to be conducted through the broadband gateway using the user account; and
sending, by the broadband gateway responsive to the authorization, at least a portion of the information associated with the user account, to a service to conduct the single transaction.

2. The method of claim 1, further comprising authorizing, by the broadband gateway, the user account to be charged once during the single transaction to fulfil charges or payments for the plurality of transactions.

3. The method of claim 1, further comprising receiving, by the broadband gateway, a first transaction of the plurality of transactions initiated by a first device of the plurality of devices, the first device residing in a network serviced by the broadband gateway.

4. The method of claim 1, further comprising receiving, by the broadband gateway via a network service provider, a first transaction of the plurality of transactions initiated by a first device of the plurality of devices, the first device residing outside a network serviced by the broadband gateway.

5. The method of claim 1, further comprising blocking or terminating the single transaction when authentication or validation using the at least a portion of the information fails.

6. The method of claim 1, further comprising displaying transaction activity associated with the user account via a user interface generated by the broadband gateway.

7. The method of claim 1, wherein the information associated with the user account comprises a plurality of settings for controlling or managing the authorization.

8. The method of claim 7, wherein the plurality of settings specify one or more of a geographical limit, and a device type restriction for the user account.

9. A system comprising:
a broadband gateway in communication with a plurality of devices, the broadband gateway comprising circuitry configured to:
control storage of information associated with a user account;
aggregate a plurality of transactions into a single transaction, the plurality of transactions associated with the user account and initiated by two or more of the plurality of devices to be conducted through the broadband gateway, each of the plurality of transactions comprising a financial transaction initiated via a respective device of the plurality of devices, the broadband gateway providing the plurality of devices access to one or more network access service providers;
authorize the single transaction to be conducted through the broadband gateway using the user account; and
send, responsive to the authorization, at least a portion of the information associated with the user account, to a service to conduct the single transaction.

10. The system of claim 9, wherein the circuitry is further configured to authorize the user account to be charged once during the single transaction to fulfil charges or payments for the plurality of transactions.

11. The system of claim 9, wherein the circuitry is further configured to receive a first transaction of the plurality of transactions initiated by a first device of the plurality of devices, the first device residing in a network serviced by the broadband gateway.

12. The system of claim 9, wherein the circuitry is further configured to receive, via a network service provider, a first transaction of the plurality of transactions initiated by a first device of the plurality of devices, the first device residing outside a network serviced by the broadband gateway.

13. The system of claim 9, wherein the circuitry is further configured to block or terminate the single transaction when authentication or validation using the at least a portion of the information fails.

14. The system of claim 9, wherein the circuitry is further configured to display transaction activity associated with the user account via a user interface generated by the broadband gateway.

15. The system of claim 9, wherein the information associated with the user account comprises a plurality of settings for controlling or managing the authorization.

16. The system of claim 15, wherein the plurality of settings specify one or more of a geographical limit, and a device type restriction for the user account.

17. A method comprising:
aggregating, by the broadband gateway in communication with a plurality of devices, a plurality of transactions initiated by two or more of the plurality of devices into a single transaction, the plurality of transactions associated with a user account, the aggregation triggered by the plurality of transactions reaching or exceeding a threshold specified for the user account, each of the plurality of transactions comprising a financial transaction initiated via a respective device of the plurality of devices, the broadband gateway providing the plurality of devices access to one or more network access service providers;
authorizing, by the broadband gateway, the single transaction to be conducted using the user account; and
communicating, by the broadband gateway responsive to the authorization, information associated with the user account to a service to conduct the single transaction.

18. The method of claim 17, further comprising triggering the aggregation based on the plurality of transactions reaching or exceeding a threshold number of transactions or total transaction value.

19. The method of claim 17, further comprising controlling, by the broadband gateway, storage of information associated with the user account.

20. The method of claim 17, further comprising authorizing the user account to be charged once during the single transaction to fulfil charges or payments for the plurality of transactions.

* * * * *